(12) United States Patent
Zhang

(10) Patent No.: US 9,871,646 B2
(45) Date of Patent: Jan. 16, 2018

(54) FRONT-END CIRCUITRY FOR MULTIBAND FREQUENCY MANAGEMENT

(71) Applicant: Microsoft Technology Licensing, LLC, Redmond, WA (US)

(72) Inventor: Chen Zhang, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 118 days.

(21) Appl. No.: 14/871,219

(22) Filed: Sep. 30, 2015

(65) Prior Publication Data

US 2017/0093552 A1    Mar. 30, 2017

(51) Int. Cl.
*H04L 5/14* (2006.01)
*H04B 7/04* (2017.01)
*H04B 1/00* (2006.01)

(52) U.S. Cl.
CPC ............ *H04L 5/14* (2013.01); *H04B 1/006* (2013.01); *H04B 7/04* (2013.01)

(58) Field of Classification Search
None
See application file for complete search history.

(56) References Cited

U.S. PATENT DOCUMENTS

| | | | |
|---|---|---|---|
| 6,169,912 B1 | 1/2001 | Zuckerman | |
| 8,548,410 B2 | 10/2013 | Jussila et al. | |
| 8,792,830 B2 | 7/2014 | Lim et al. | |
| 2005/0007291 A1 | 1/2005 | Fabrega-Sanchez et al. | |
| 2007/0222697 A1 | 9/2007 | Caimi et al. | |
| 2009/0009404 A1 | 1/2009 | Buer et al. | |
| 2009/0180403 A1* | 7/2009 | Tudosoiu | H04B 1/006 370/278 |
| 2012/0327825 A1 | 12/2012 | Gudem et al. | |
| 2013/0039227 A1 | 2/2013 | Ji et al. | |
| 2013/0149975 A1 | 6/2013 | Yu et al. | |
| 2014/0145897 A1 | 5/2014 | Sonnerat et al. | |

(Continued)

OTHER PUBLICATIONS

Ikonen et al, "Multi-feed RF Front-ends and Cellular Antennas for Next Generation Smartphones", published Jan. 2012, In Technical Report, 11 pages.

(Continued)

*Primary Examiner* — Vinncelas Louis
(74) *Attorney, Agent, or Firm* — Holzer Patel Drennan

(57) ABSTRACT

The described technology provides front-end antenna architecture for wireless communication that manages multiple frequency sub-bands in a manner that results in a low insertion loss rate. Further, the components of the architecture are smaller than typical wireless communication antenna architectures, and therefore the described architecture can be accommodated in a smaller area than typical architectures without a decrease in efficiency. A matching circuit is communicatively connected to each frequency sub-band's respective signal path. When two or more sub-bands are requested for high-speed wireless communication, the matching circuits match the impedance of each sub-band with one another. Matching the impedance allows two or more sub-bands to be used to wirelessly communicate while maintaining high efficiency. The matching circuits are disabled when only one sub-band is needed for wireless communication.

16 Claims, 12 Drawing Sheets

(56) References Cited

U.S. PATENT DOCUMENTS

2014/0329475 A1    11/2014   Ella et al.
2014/0378075 A1    12/2014   Verma
2015/0109977 A1     4/2015   Loh
2015/0133067 A1*    5/2015   Chang .................... H04B 1/48
                                                        455/78

OTHER PUBLICATIONS

Koga et al "Mobile Handset Antenna Solution with Optimized Matching Circuits for Carrier Aggregation Operation", published Aug. 3, 2014, In Proceedings of IEEE, abstract only.

Li et al, "A Fully Matched LTE-A Carrier Aggregation Quadplexer based on BAW and SAW Technologies," published Sep. 3, 2014, In Proceedings of IEEE, abstract only.

"Wireless Handset RF Front-End Optimization," published Oct. 2014, In White Paper, 28 pages.

"International Search Report and Written Opinion Issued in PCT Application No. PCT/US2016/048936", dated Nov. 24, 2016, 11 Pages.

"International Preliminary Report on Patentability Issued in PCT Application No. PCT/US2016/048936", dated Sep. 21, 2017, 6 Pages.

* cited by examiner

FRONT-END CIRCUITRY FOR MULTIBAND FREQUENCY MANAGEMENT

BRIEF DESCRIPTIONS OF THE DRAWINGS

DETAILED DESCRIPTIONS

Typical front-end antenna architectures have been subject to difficulties with size, insertion loss, return loss, specific absorption rate (SAR) problems, price, and/or efficiency. For example, some architectures utilize one antenna for high frequency bands and another antenna for middle and low frequency bands in combination with a diplexer, which separates the middle and low bands by using a combination of filters. This type of architecture suffers from problems with insertion loss and typically occupies an undesirable amount of space. This architecture can be used in mobile devices but typically results in a wider-than-desired bezel, which reduces usable display space. Another typical front-end antenna architecture using the same antenna configuration employs a quadplexer in sub-band pairs to allow bi-directional communication (FBAR technology), but this architecture is also large and expensive.

An antenna architecture that has a single antenna for high and middle frequency bands and a separate antenna for low frequency bands may occupy less space. However, due to the close proximity of the high and middle frequency bands, efficient filtering presents a challenge and the resulting insertion loss may be high.

The technology described herein provides an antenna architecture utilizing a single antenna for high and middle frequency bands and a separate antenna for low frequency bands while presenting a smaller footprint (e.g., occupied area) and maintaining a low insertion loss. The disclosed technology can avoid the typical issue of insertion loss by utilizing a matching circuit in conjunction with a pair of corresponding sub-bands, which provides impedance matching between the sub-bands. In a same or separate embodiment, the matching circuit may be actuated by a connected enable/disable switch, which may be used when impedance matching may or may not be desired.

Figure 1:
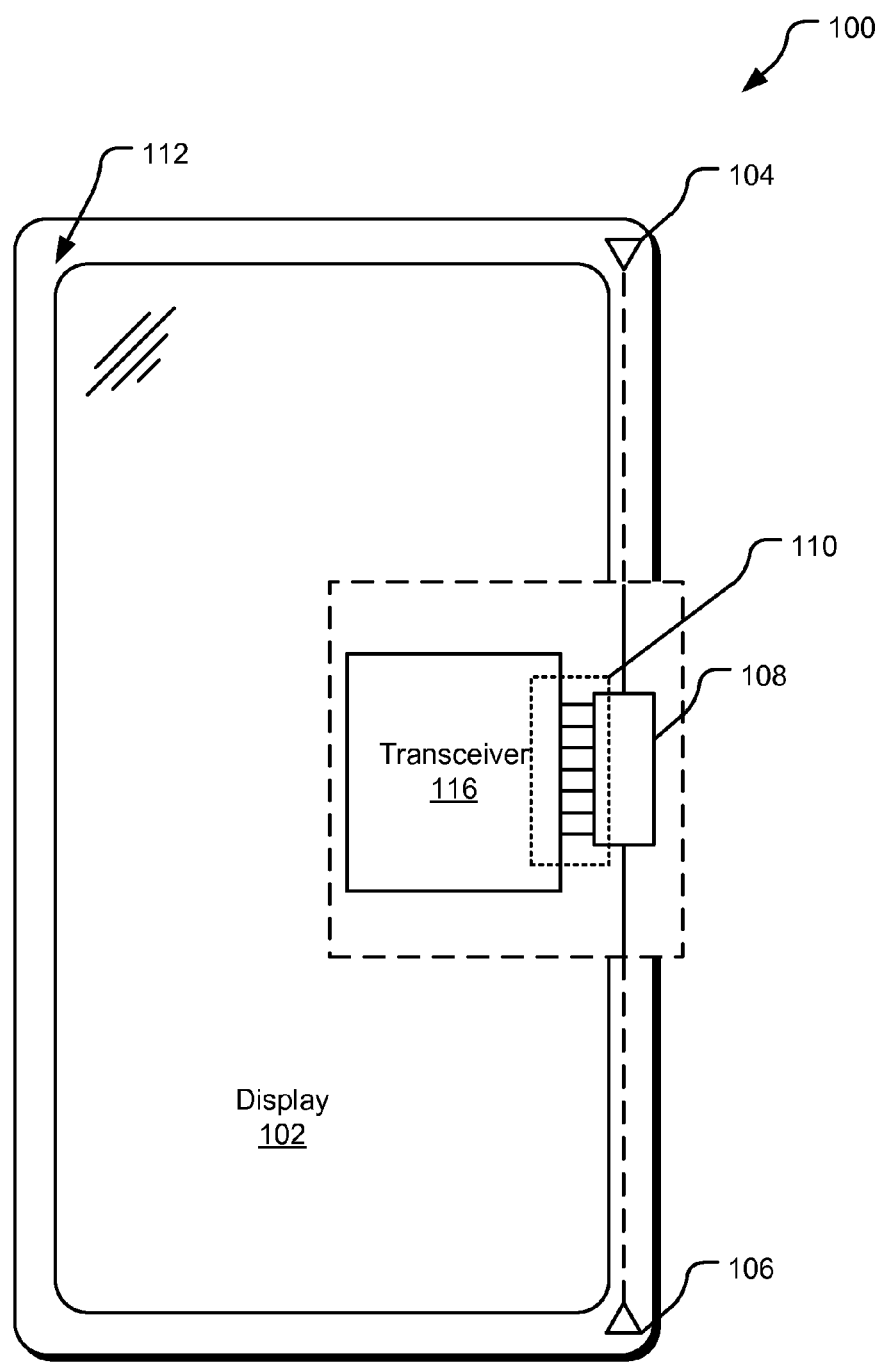
FIG. 1 illustrates an example wireless communication device.

FIG. 1 illustrates an example wireless communication device 100. In this example implementation, wireless communication device 100 is a mobile phone, but in other implementations, the wireless communication device could be any type of device that uses wireless communication protocols (e.g., 3G, 4G, LTE, Wi-Fi, Near Field Communication (NFC), Bluetooth®, GPS) such as a desktop computer, laptop computer, tablets, and other similar devices. In this implementation, the wireless communication device includes a display 102, a high/middle frequency band antenna 104, a low frequency band antenna 106, a multiband frequency band selector 108, a plurality of Rx and Tx ports 110, a transceiver 116, and a bezel 112 that encases the display 102. It should be understood that the wireless communication device 100 may have a different configuration of antennas, such as three separate antennas for high, middle, and low frequencies, a single antenna for all frequencies, or a single antenna for low and middle frequencies, and a separate antenna for high frequencies.

In the illustrated implementation, multiband frequency band selector 108 includes circuitry and one or more processors for communicating radiofrequency signals via one or more antennas. The circuitry includes one or more RF switch banks, matching circuitry, enable/disable switches for the matching circuitry, and one or more duplexers, or a similar combination. The plurality of Rx and Tx ports 112 provide access to and from the transceiver 116 of the wireless communication device 100, respectively. The transceiver 116 facilitates communication between the plurality of Rx and Tx ports 112 and the communication channels (not shown) of the wireless communication device 100.

Figure 2:
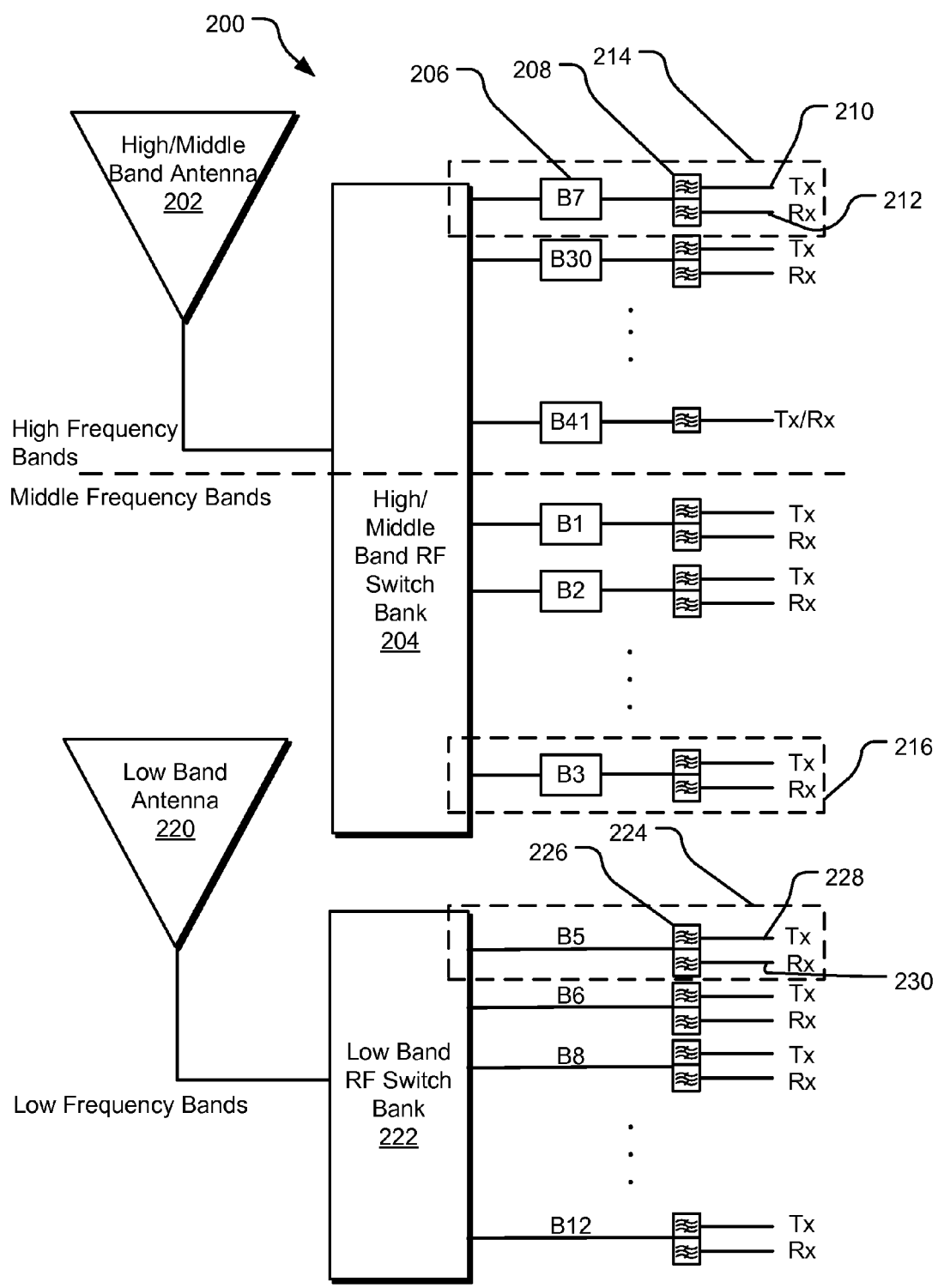
FIG. 2 illustrates an example front-end architecture for multiband frequency management.

FIG. 2 illustrates an example front-end architecture 200 for multiband frequency management. It should be understood that the architecture 200 can be a designed on a chip or may be constructed on a printed circuit board assembly (PCBA). The front-end architecture 200 includes a high/middle frequency band antenna 202 configured to transmit and receive a frequency range of high and middle frequency bands. The high/middle frequency band antenna 202 is communicatively connected to a high/middle band RF switch bank 204. The high/middle band RF switch bank 204 is a system of discrete electronic components configured to selectively communicate the frequency range of high and middle frequency antenna signals between multiple inputs and multiple outputs. The frequency range of high and middle frequency bands includes a subset of at least one sub-band. The high/middle band RF switch bank 204 selectively communicates the at least one sub-band to and from at least one frequency matched port assembly 214 of a plurality of match port assemblies. The high/middle band RF switch bank 204 effectively selects a sub-band and communicates it between the antenna and RX/TX ports corresponding to that sub-band.

In this example implementation, the sub-bands are referred to as the letter "B" followed by a sub-band number. In this implementation, sub-band B7 is allocated to frequency matched port assembly 214, sub-band B3 is allocated to a frequency matched port assembly 216, and other sub-bands (B22, B1, etc.) are allocated to other match port assemblies, which are not identified in FIG. 2. It should be understood that implementations may vary and the number of match port assemblies may vary depending on which sub-bands are necessary for the desired wireless communication.

The frequency matched port assembly 214 includes a matching circuit 206 connected to a duplexer 208. Some frequency matched port assemblies will not include a duplexer, but will include a filter. The matching circuit 206 is configured to match the impedance of the allocated sub-band (sub-band B7 in this example illustration) with the impedance of a separate corresponding sub-band. The matching circuit 206 may include a number of resistors, capacitors, and inductors in a variety of different configurations depending on the frequencies of the particular sub-bands being matched. (See detailed description of FIGS. 6, 7, 8, 9, 10, 11 for a description of matching circuits for corresponding sub-band pairs).

The duplexer 208 is communicatively connected to communication channels of a wireless communications device via a Tx port 210 and Rx port 212. The duplexer 208 uses a combination of filters to selectively pass transmission signals and receive signals of a defined radiofrequency sub-band to and from their respective Rx/Tx ports, in effect allowing bi-directional communication along a single signal path. Each duplexer is configured for a particular sub-band. In this example implementation, the duplexer 208 is configured for sub-band B7, although similar configurations may be employed for other sub-bands.

The front-end architecture 200 further includes a low frequency band antenna 220 configured to communicate a frequency range of low frequency bands. The low frequency band antenna 220 is communicatively connected to a low band RF switch bank 222. The low band RF switch bank 222 is a system of discrete electronic components configured to selectively communicate the frequency range of low frequency bands. The frequency range of low frequency bands includes a subset of at least one sub-band. The low band RF switch bank 222 can selectively communicate the at least one sub-band to and from a particular port assembly 224 of a plurality of port assemblies.

In this implementation, sub-band B5 is allocated to the port assembly 224, and other sub-bands are allocated to other port assemblies, which are not identified in FIG. 2. It should be understood that implementations may vary and the number of port assemblies may vary depending on which sub-bands are needed for the desired wirelesses communication.

The port assembly 224 includes a duplexer 226 communicatively connected to a Tx port 228 and an Rx port 230 of the communication channels of the wireless communication device. The duplexer 226 uses a combination of filters to route transmission signals and receive signals to and from their respective ports, in effect allowing bi-directional communication along a single signal path. Each duplexer is configured for a respective sub-band. In this example implementation, the duplexer 226 is configured for sub-band B5.

Two separate sub-bands are corresponding if both are used to wirelessly communicate with a high data rate. For example, in the LTE wireless communication standard, one or more carriers (Verizon®, Sprint®, etc.) may require or allow two or more sub-bands to be used simultaneously for high-speed wireless communication. The process of a single wireless communications device using two or more sub-bands from the same or different carriers for an increased bandwidth is referred to as carrier aggregation (CA). The two sub-bands used may be in contiguous sections of the LTE spectrum or may be in different separated sections. Typical front-end architectures use quadplexers to filter and communicate the two corresponding sub-bands from the other sub-bands on the spectrum. In the architecture implementation described herein, a quadplexer is not needed. In this or other implementations, the required high and middle sub-bands are selectively communicated by high/middle band RF switch bank 204 to and from the respective match port assemblies. When CA is instructed, the respective match port assemblies match the impedance of the respective sub-bands with one another. Matching the impedance of the corresponding sub-bands results in a low-insertion loss compared to similar or different architectures. Further, this architecture has a small size and is less expensive than typical architectures that use quadplexers for CA. The smaller size antenna architecture may result in a smaller bezel, which is desirable for a larger display size for many wireless communication devices.

Figure 3:
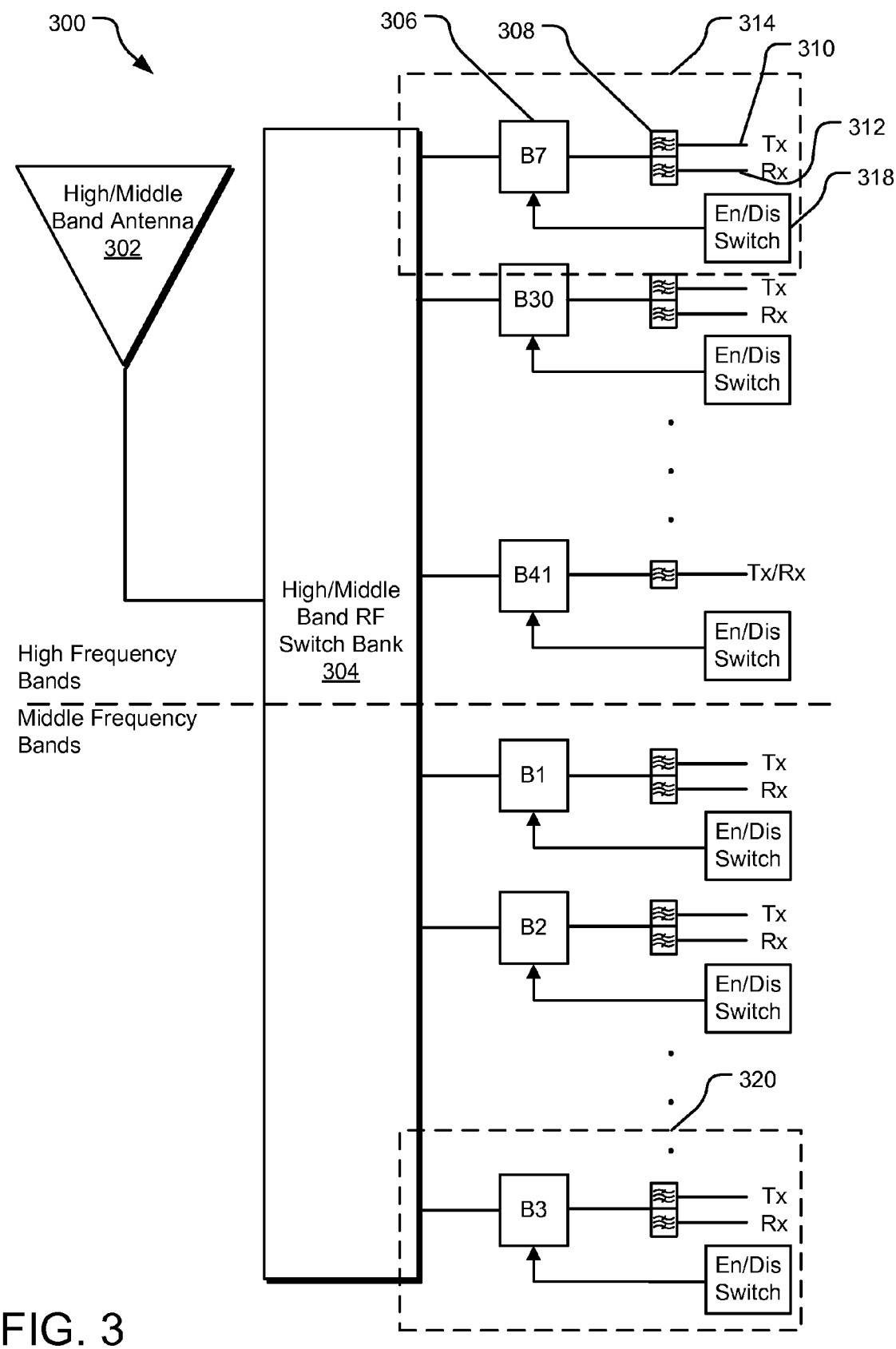
FIG. 3 illustrates an example front-end architecture for a high/middle band antenna.

FIG. 3 illustrates an example front-end architecture 300 for a high/middle frequency band antenna. It should be understood that the architecture 300 can be designed on a chip or may be constructed on a printed circuit board assembly (PCBA). The architecture 300 includes a high/middle frequency band antenna 302 configured to communicate a range of high and middle frequency bands. The high/middle frequency band antenna 302 is communicatively connected to a high/middle band RF switch bank 304. The high/middle band RF switch bank 304 is a system of discrete electronic components configured to selectively communicate the spectrum of high and middle frequency antenna signals between multiple inputs and multiple outputs. The frequency range of high and middle frequency bands includes a subset of at least one sub-band. The high/middle band RF switch bank 304 is configured to selectively communicate the at least one sub-band to a designated frequency matched port assembly 314 of a plurality of frequency matched port assemblies.

In this example implementation, sub-band B7 is allocated to the frequency matched port assembly 314, sub-band B3 is allocated to a frequency matched port assembly 320, and other sub-bands (B22, B1, etc.) are allocated to other frequency matched port assemblies, which are not identified. It should be understood that implementations may vary and the number of frequency matched port assemblies may vary depending on which sub-bands are necessary for the desired wireless communication.

The Frequency matched port assembly 314 includes a matching circuit 306 connected to a duplexer 308, which is connected to a Tx port 310 and an Rx port 312 of the communication channels of a wireless communications device. The matching circuit 306 is configured to match the impedance of the allocated sub-band (sub-band B7 in this example illustration) with the impedance of a separate corresponding sub-band. The matching circuit 306 may include a number of resistors, capacitors, and inductors in a variety of different configurations depending on the frequency of the particular sub-bands that are being matched. (See detailed descriptions of FIGS. 6, 7, 8, 9, 10, 11 for a detailed discussion of the matching circuits for corresponding sub-band pairs).

The frequency matched port assembly 314 further includes an enable/disable switch 318, which is connected to the matching circuit 306. The enable/disable switch 318 is configured to enable or disable the matching circuit 306. If impedance matching is needed for the use of two sub-bands, then the enable/disable switch 318 enables the matching circuit 306, which then matches impedance with another corresponding sub-band. If impedance matching is not desired, then the enable/disable switch 318 disables the matching circuit 306, and impedance matching is suspended. The high/middle band antenna architecture 300 is configured to act dynamically, meaning that different matching circuits can be enabled and disabled by their respective switches as conditions or needs change.

The duplexer 308 is communicatively connected to communication channels of a wireless communications device via a Tx port 310 and Rx port 212. The duplexer 208 uses a combination of filters to route transmission signals and receive signals to and from their respective ports, in effect allowing bi-directional communication along a single signal path. Each duplexer is configured for a respective sub-band. In this illustrated implementation, duplexer 308 is configured for sub-band B7.

As discussed above with respect to FIG. 2, when a device is instructed to use CA, two or more separate sub-bands may be utilized for high-speed wireless communication. In this and other implementations, the two required sub-bands needed for carrier aggregation are communicated with frequency matched port assemblies via an RF switch bank (e.g., high/middle band RF switch bank 304). The enable/disable switch enables the respective matching circuits and the impedances of the two sub-bands are matched. Matching the impedance of the two-sub-bands results in a low insertion loss rate compared to typical antenna architectures that use quadplexers to filter the corresponding sub-bands. If CA is not needed and only one sub-band is necessary for wireless communication, then the digital signal processor (not shown) will actuate the enable/disable switch to disable the matching circuits of the two sub-bands, and one of the sub-bands will be used to communicate between the antenna and transceiver of the wireless communication device.

Figure 4:
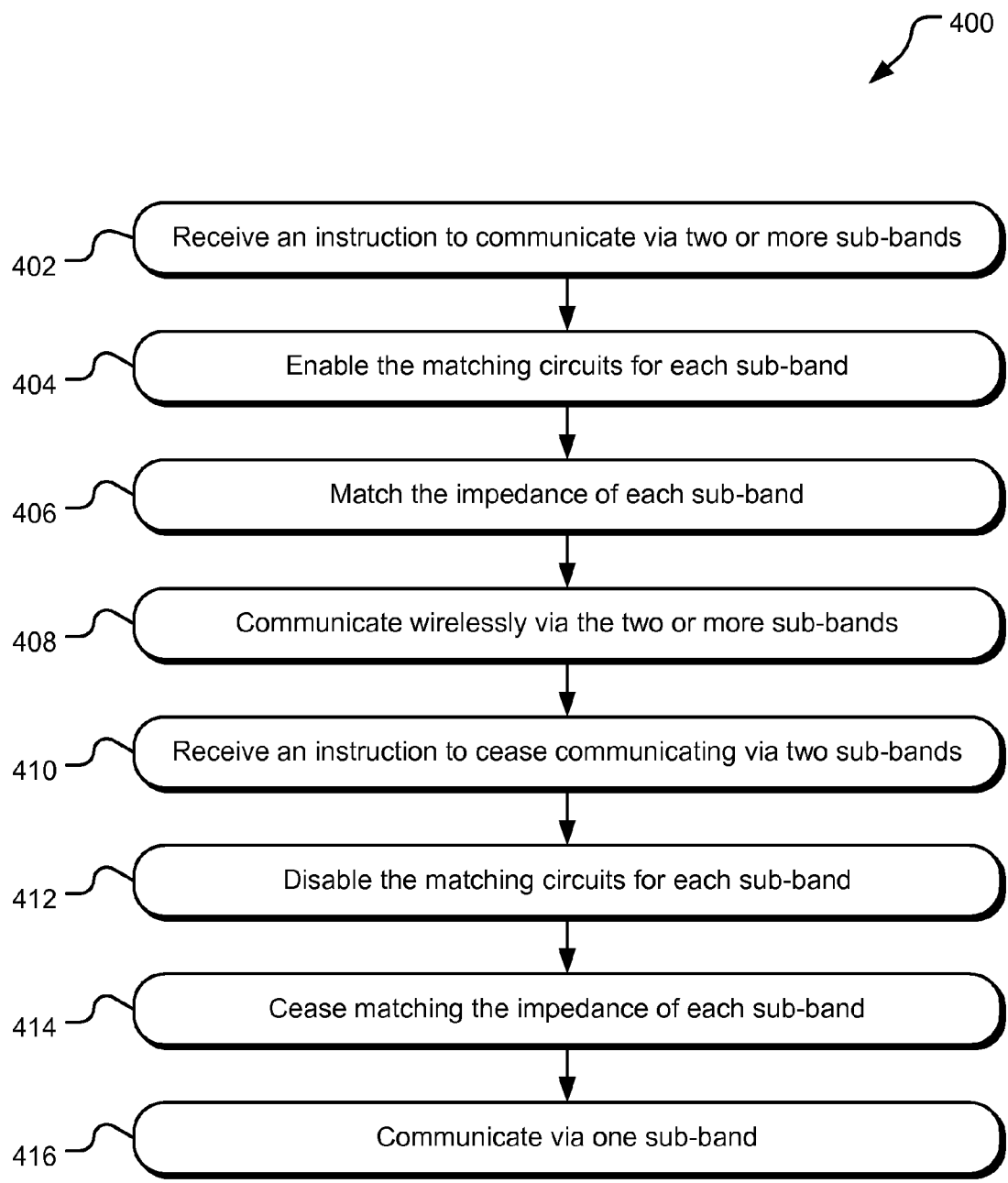
FIG. 4 illustrates example operations for transmitting antenna signals to communication channels of a wireless communication device.

FIG. 4 illustrates example operations 400 for transmitting antenna signals to communication channels of a wireless communication device. A receiving operation 402 receives an instruction to communicate via two or more sub-bands. The instruction may be sent by one or more processor devices through a transceiver, based on instructions from the carrier network, mobile device configuration, etc. The instruction may be necessitated by the fact that carrier aggregation is available for high speed wireless transmission. Upon receiving the instruction, an enabling operation 404 enables the matching circuits for the two or more sub-bands. Enabling operation 404 may be achieved by actuating an enable/disable switch attached to each of the two or more sub-bands' respective matching circuits. Matching operation 406 matches the impedance of the two or more sub-bands. Matching operation 406 is accomplished by the matching circuits that are attached to a signal path designated to each sub-band. Communication operation 408 communicates wirelessly via the two or more sub-bands. The two or more sub-bands may be transmitted within the wireless communications device between an antenna port and a transceiver across an RF switch bank configured to selectively communicate the two or more sub-bands between the antenna port and each sub-bands' respective signal path.

Receiving operation 410 receives an instruction to cease communicating via two sub-bands. The instruction may be sent by one or more processor devices through a transceiver, based on instructions from the carrier network, mobile device configuration, etc. The instruction may be necessitated by the fact that carrier aggregation is no longer obtainable for high-speed wireless communication because only one sub-band is available for wireless communication. Upon receiving the instruction, a disabling operation 412 disables the matching circuits for each sub-band. The disabling operation 412 may be accomplished by disabling the enable/disable switch attached to each of the two or more sub-bands respective matching circuits. Once the respective matching circuits are disabled, cease operation 414 ceases matching the impedance of each sub-band. A communication operation 416 communicates wirelessly via one sub-band. The one sub-band may be transmitted within the wireless communications device between an antenna port and a transceiver across an RF switch bank configured to selectively communicate the sub-band between the antenna port and the sub-band's respective signal path.

It should be noted that the above operations 400 for transmitting antenna signals to communication channels of a wireless communication device, can be completed dynamically, meaning that the wireless communications device may switch from using two or more sub-bands to using a single sub-band and vice versa depending on the changing conditions or needs of the wireless communication device.

Figure 5:
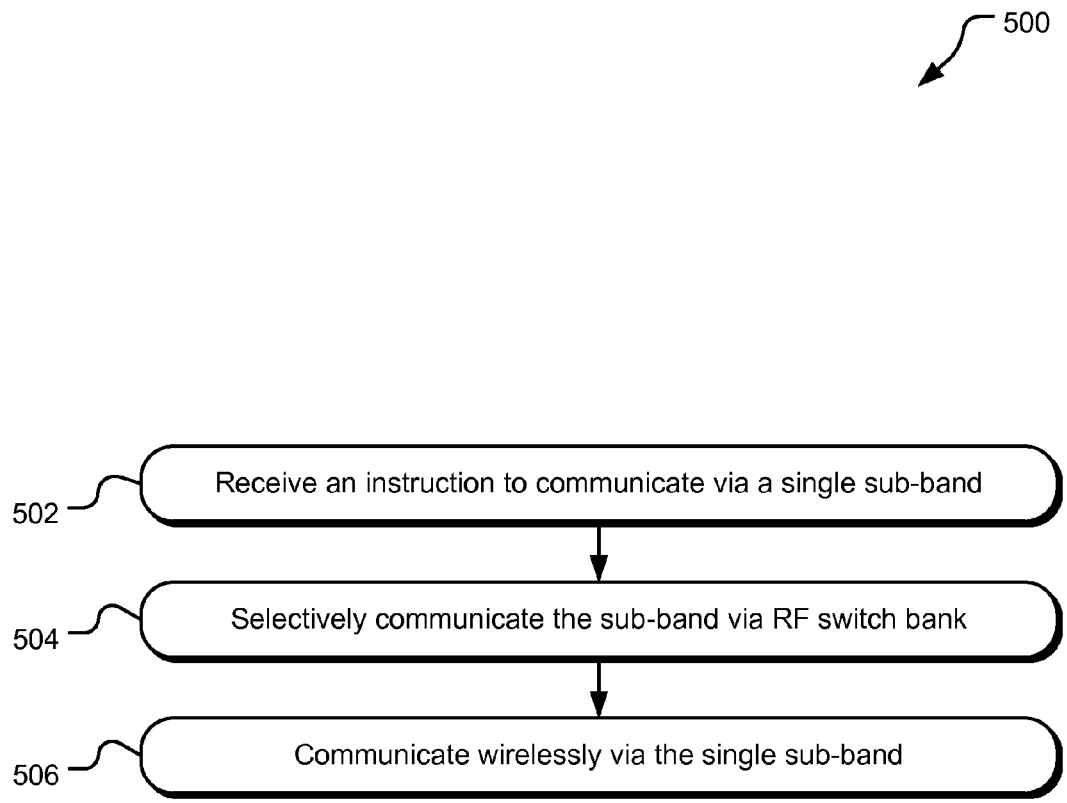
FIG. 5 illustrates alternative example operations for transmitting antenna signals to communication channels of a wireless communication device.

FIG. 5 illustrates alternative example operations 500 for transmitting antenna signals between communication channels of a wireless communication device. A receiving operation 502 receives an instruction to communicate via a single sub-band. The instruction may be sent by one or more processor devices through a transceiver, based on instructions from the carrier network, mobile device configuration, etc. The instruction may be necessitated by the fact that carrier aggregation is not available for high-speed wireless transmission. Upon receiving the instruction, selectively communicate operation 504 selectively communicates the sub-band using an RF switch bank. The RF switch bank is configured to selectively communicate sub-band signals to and from one or more antenna ports and one or more designated Rx/Tx port pairs. After the RF switch bank selectively communicates the sub-band, communication operation 506 communicates wirelessly via the sub-band.

Figure 6:
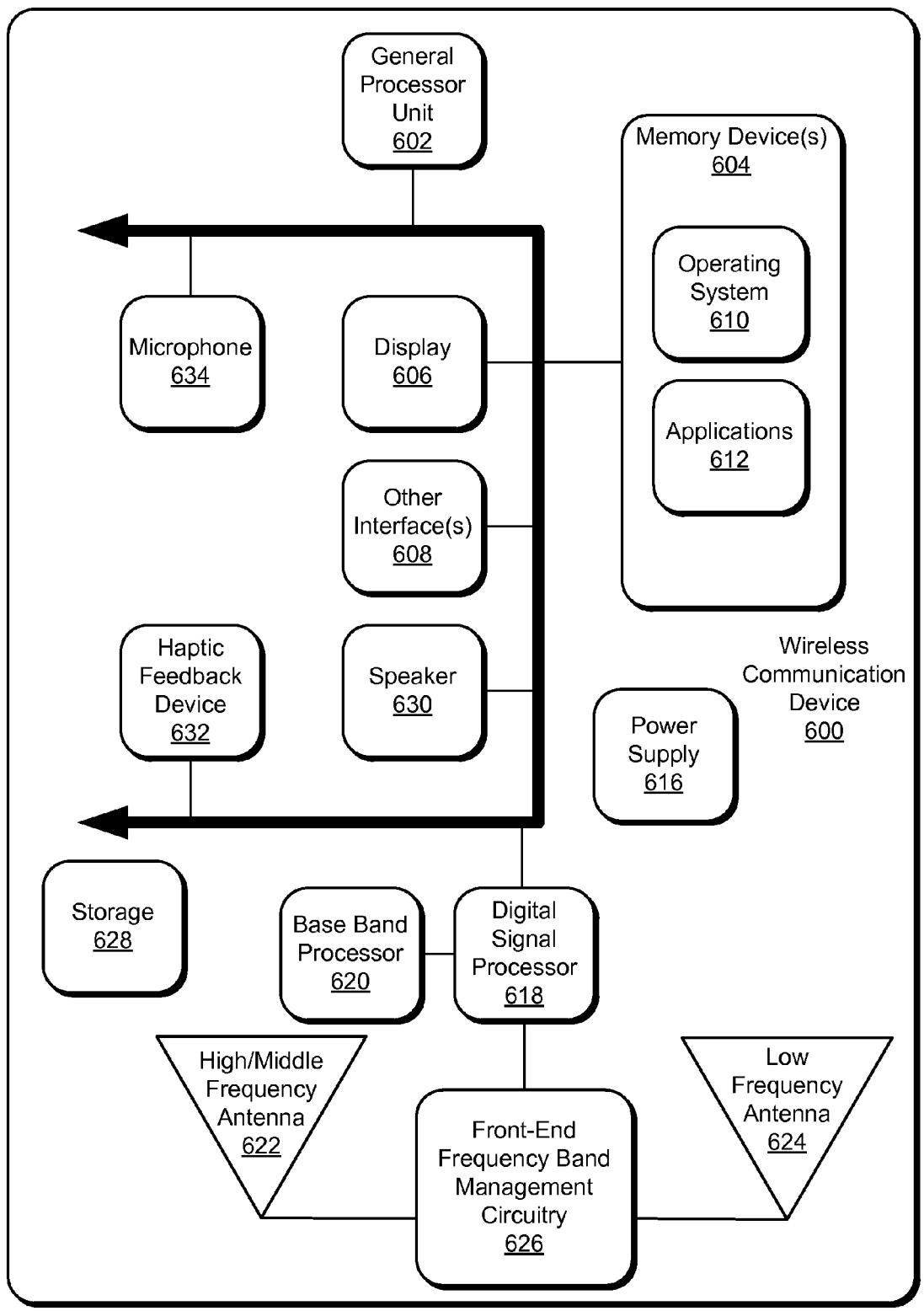
FIG. 6 illustrates an example schematic of a wireless communication device configured to perform multiband frequency management.

FIG. 6 illustrates an example schematic of a wireless communication device 600 configured to perform multiband frequency management. The wireless communication device 600 includes a general processor unit 602, one or more memory devices 604, a display 606 (e.g., a touchscreen display and/or lighted display), a haptic feedback device 632 (e.g., a tactile electronic display or one or more actuators providing vibratory feedback), a speaker 630, and other interfaces 608 (e.g., buttons). The one or more memory devices 604 may include volatile memory (e.g., RAM) and non-volatile memory (e.g., flash memory). An operating system 610, such as the Microsoft Windows® operating system, the Microsoft Windows® Phone operating system or a specific operating system designed for a wireless communication device, resides in memory 604 and is executed by the general processor unit 602, although it should be understood that other operating systems may be employed.

Wireless communication device 600 further includes a digital signal processor 618, a base band processor 620, and front-end frequency band management circuitry 626. One or more applications 612 (e.g., software programs) are loaded in the memory 604 and executed by the general processor unit 602. Other applications such as applications to support and control front-end frequency band management circuitry 626 may be loaded in the memory 604 and executed by the digital signal processor 618.

The wireless communication device 600 includes a power supply 616, which is powered by one or more batteries or other power sources and which provides power to other components of the wireless communication device 600. The power supply 616 may also be connected to an external power source that overrides or recharges the built-in batteries or other power sources.

The wireless communication device 600 includes a high/middle frequency antenna 622 and a low frequency antenna 624 to provide network connectivity (e.g., a mobile phone network, Wi-Fi®, BlueTooth®, etc.), and front-end frequency band management circuitry 626. Front-end frequency band management circuitry 626 may include a number of RF switch banks, matching circuits, enable/disable switches, Rx and Tx ports, duplexers, diplexers, transceivers, etc. The front-end frequency band management circuitry 626 may be included in a chip set or may be constructed on a PCBA. It should be understood that a different antenna architecture may be employed. The wireless communication device 600 may also include various other components, such as a positioning system (e.g., a global positioning satellite transceiver), one or more accelerometers, one or more cameras, an audio interface (e.g., a microphone 634, an audio amplifier and speaker and/or audio jack), and additional storage 628. Other configurations may also be employed.

In an example implementation, a mobile operating system, various applications (including applications to support and control front-end frequency band management circuitry 626) and other modules and services may be embodied by instructions stored in memory 604 and/or storage devices 628 and processed by the processing unit 602, digital signal processor 618 and base band processor 620. Other data may be stored in memory 604 and/or storage devices 608 as persistent data stores.

The wireless communication device 600 may include a variety of tangible processor-readable storage media and intangible processor-readable communication signals. Tangible processor-readable storage can be embodied by any available media that can be accessed by the wireless communication device 600 and includes both volatile and nonvolatile storage media, removable and non-removable storage media. Tangible processor-readable storage media excludes intangible and transitory communications signals and includes volatile and nonvolatile, removable and non-removable storage media implemented in any method or technology for storage of information such as computer readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the wireless communication device 600. In contrast to tangible processor-readable storage media, intangible processor-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

FIGS. 7 to 12 illustrate example schematics of a switch bank to port assembly for particular sub-band pairs for CA. The following Table-1 provides the sub-band pairs with their elements (including inductors and capacitors along with their measurements). The table describes each sub-band's elements, in order, from the switch bank to each respective duplexer.

TABLE 1

Switch bank to duplexer configurations for CA sub-band pairs.

| Sub-Band Pair (CA Combination) | Sub-Band | Element 1 | Element 2 | Element 3 |
|---|---|---|---|---|
| (2, 30) | Band 2 | 15 pF Capacitor | 6.2 nH Inductor* | |
|  | Band 30 | 5.6 nH Inductor* | | |
| (3, 7) | Band 3 | 15 pF Capacitor* | 6.2 nH Inductor | |
|  | Band 7 | 7.5 nH Inductor* | | |
| (4, 30) | Band 4 | 3.3 pF Capacitor | 47 nH Inductor* | |
|  | Band 30 | 5.6 nH Inductor* | | |
| (25, 41) | Band 25 | 1 nH Inductor | 27 nH Inductor* | |
|  | Band 41 | 1.5 pF Capacitor | 3.3 nH Inductor* | 4.7 pF Capacitor |
| (1, 3) | Band 1 | 1.5 nH Inductor | 24 nH Inductor* | |
|  | Band 3 | 15 pF Capacitor | 6.2 nH Inductor* | |
| (2, 4) | Band 2 | 15 pF Capacitor | 6.2 nH Inductor* | |
|  | Band 4 | 3.3 pF Capacitor | 47 nH Inductor* | |

*Element Connected to an enable/disable switch,
The match values based simulation result, those may subject to change with board test results.

Figure 7:
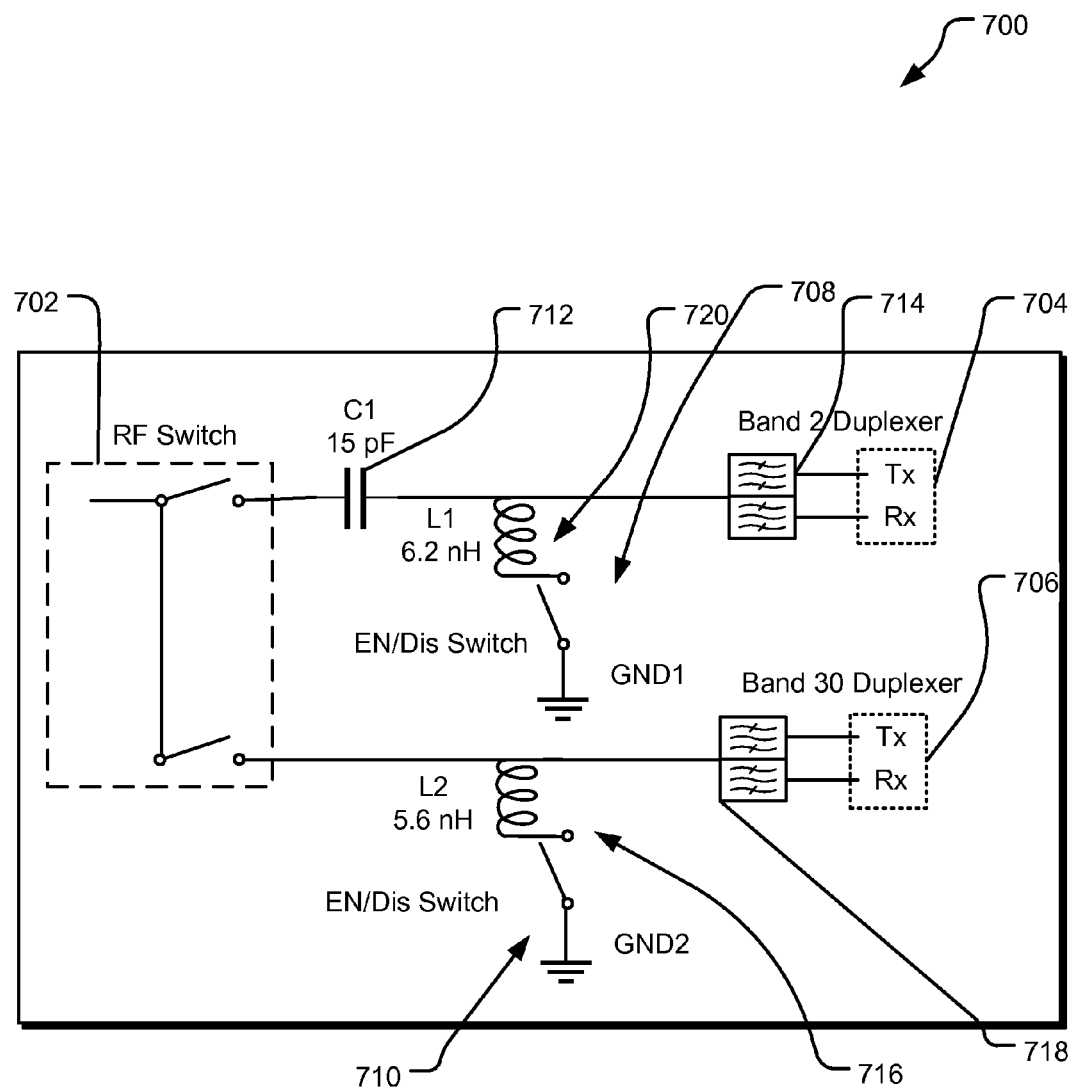
FIG. 7 illustrates an example schematic of a switch bank to port assembly for a particular sub-band pair.

FIG. 7 illustrates an example schematic of a switch bank to port assembly 700 for a particular sub-band pair. The schematic illustrates the elements required from a switch 702 of a RF switch bank (not shown) to a pair of transmission ports 704 and 706 of the communication channels of the wireless communication device for a sub-band 2 and sub-band 30 impedance matching circuit. The schematic illustrates that a signal path for band 2 requires 15 pF capacitor 712 followed by a 6.2 nH inductor 720 connected to an enable/disable switch 708 followed by a duplexer 714 configured for bi-directional communication for band 2. The band is then split wherein Tx port of the transmission port 704 transmits communications towards the antenna from the wireless communication device, and the Rx port of the transmission port 704 receives communications from the antenna for the wireless communication device.

The path for band 30 requires a 5.6 nH inductor 716 connected to enable/disable switch 710 followed by a duplexer 718 configured for bi-directional communication for band 30. The band is then split wherein the Tx port of the transmission port 706 transmits communications towards the antenna from the wireless communications device, and the Rx port of the transmission port 706 receives communications from the antenna for the wireless communication device.

Figure 8:
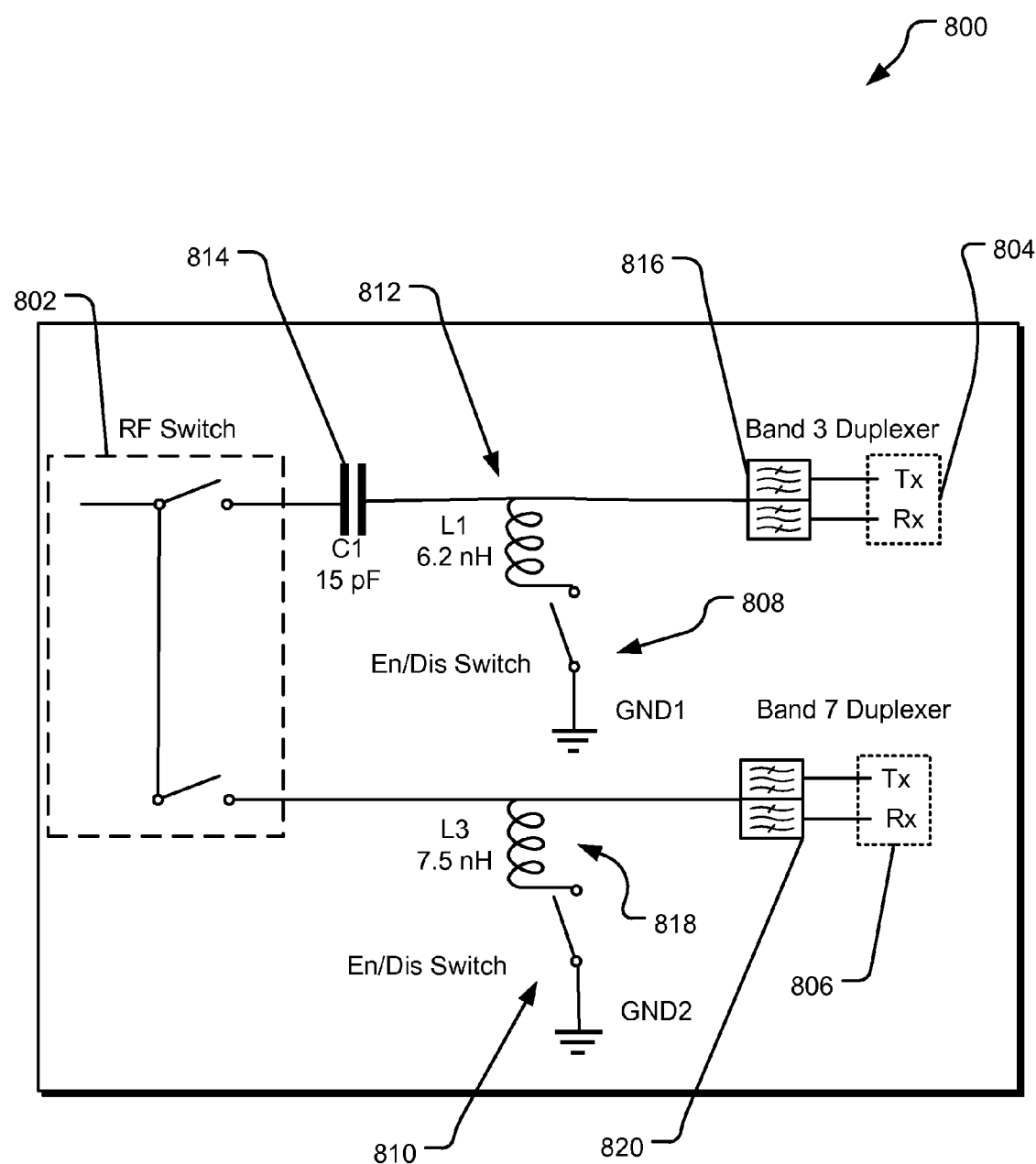
FIG. 8 illustrates another example schematic of a switch bank to port assembly for a particular sub-band pair.

FIG. 8 illustrates an example schematic of a switch bank to port assembly 800 for a particular sub-band pair. The schematic illustrates the elements required from a switch 802 of a RF switch bank (not shown) to a pair of transmission ports 804 and 806 to the communication channels of the wireless communication device for a sub-band 3 and sub-band 7 impedance matching circuit. The schematic illustrates that a signal path for band 3 requires 15 pF capacitor 814 followed by a 6.2 nH inductor 812 connected to enable/disable switch 808 followed by a duplexer 816 configured for bi-directional communication for band 3. The band is then split wherein Tx port of the transmission port 804 transmits communications towards the antenna from the wireless communication device, and the Rx port of the transmission port 804 receives communications from the antenna for the wireless communication device.

The path for band 7 requires a 7.5 nH inductor 818 connected to enable/disable switch 810 followed by a duplexer 820 configured for bi-directional communication for band 7. The band is then split wherein the Tx port of the transmission port 806 transmits communications towards the antenna from the wireless communications device, and the Rx port of the transmission port 806 receives communications from the antenna for the wireless communication device.

Figure 9:
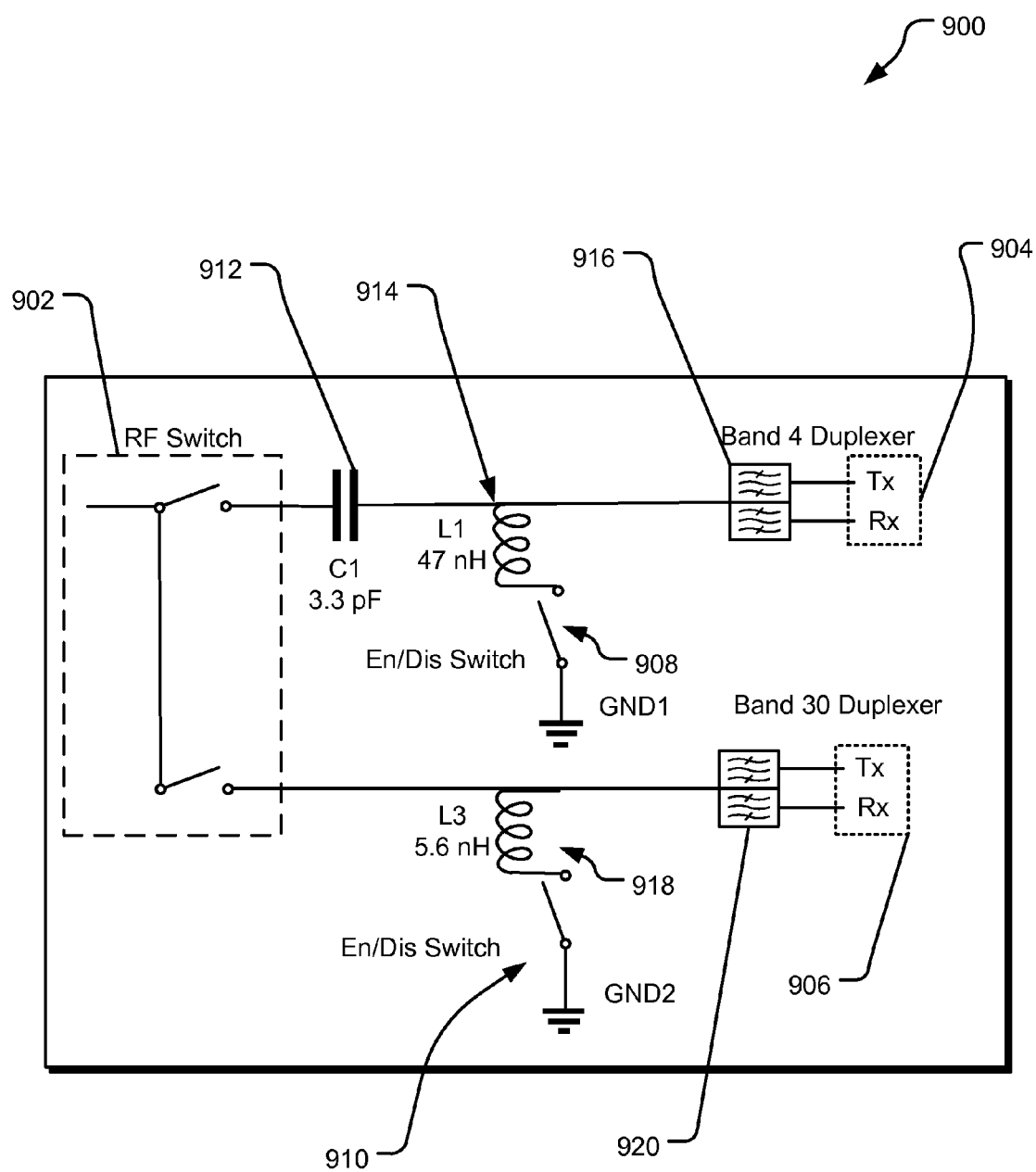
FIG. 9 illustrates another example schematic of a switch bank to port assembly for a particular sub-band pair.

FIG. 9 illustrates another example schematic of a switch bank to port assembly 900 for a particular sub-band pair. The schematic illustrates the elements required from a switch 902 of a RF switch bank (not shown) to a pair of transmission ports 904 and 906 to the communication channels of the wireless communication device for a sub-band 4 and sub-band 30 impedance matching circuit. The schematic illustrates that a signal path for band 4 requires a 3.3 pF capacitor 912 followed by a 47 nH inductor 914 connected by enable/disable switch 908 followed by duplexer 916 configured for bi-directional communication for band 4. The band is then split wherein Tx port of the transmission port 904 transmits communications towards the antenna from the wireless communication device, and the Rx port of the transmission port 904 receives communications from the antenna for the wireless communication device.

The path for band 30 requires a 5.6 nH inductor 918 connected to an enable/disable switch 910 followed by a duplexer 920 configured for bi-directional communication for band 30. The band is then split wherein the Tx port of the transmission port 906 transmits communications towards the antenna from the wireless communications device, and the Rx port of the transmission port 906 receives communications from the antenna for the wireless communication device.

Figure 10:
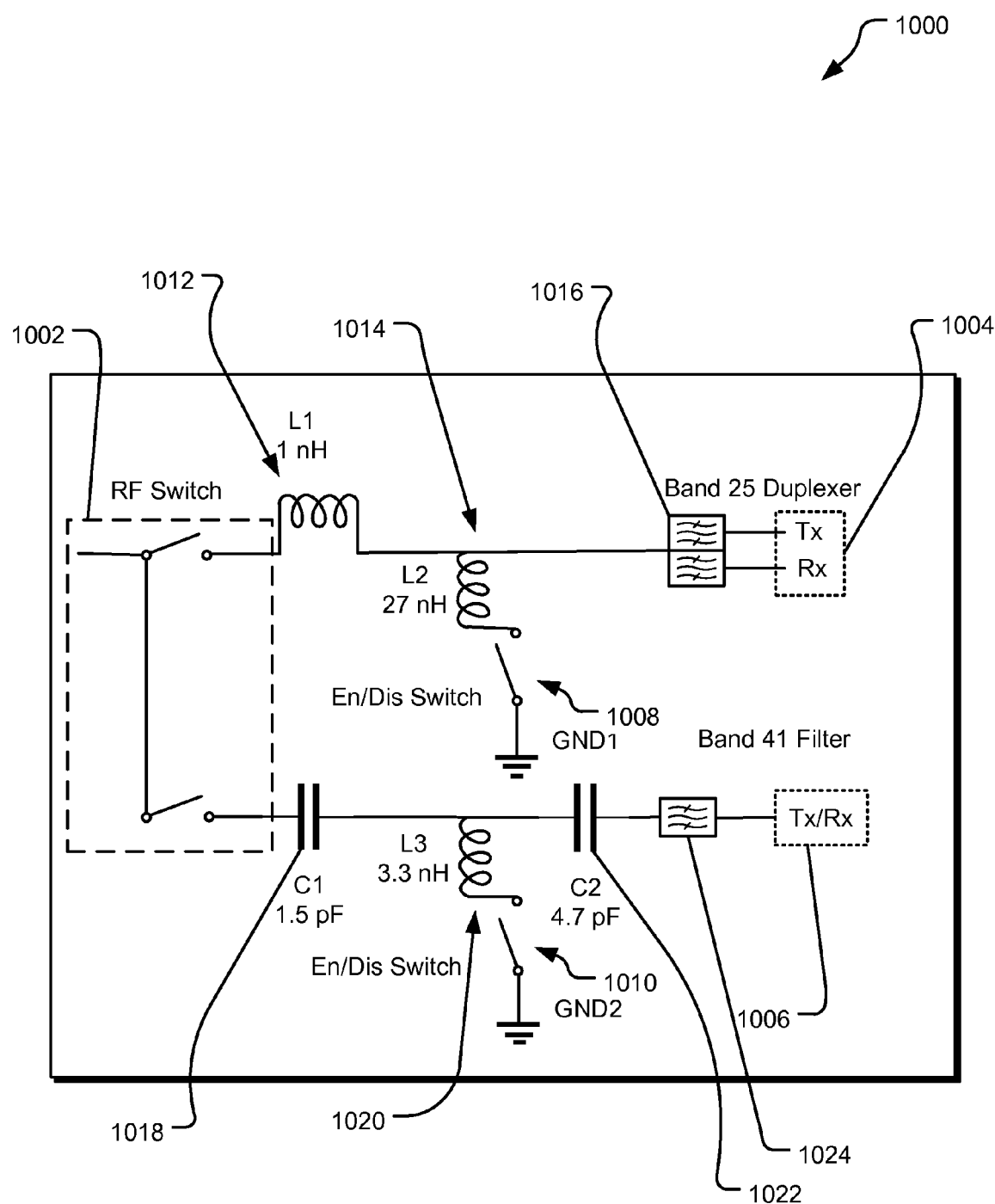
FIG. 10 illustrates another example schematic of a switch bank to port assembly for a particular sub-band pair.

FIG. 10 illustrates another example schematic of a switch bank to port assembly 1000 for a particular sub-band pair. The schematic illustrates the elements required from a switch 1002 of a RF switch bank (not shown) a pair of transmission ports 1004 and 1006 to the communication channels of the wireless communication device for a sub-band 25 and sub-band 41 impedance matching circuit. The schematic illustrates that a signal path for band 25 requires a 1 nH inductor 1012 followed by a 27 nH inductor 1014 connected to enable/disable switch 1008 followed by duplexer 1016 configured for bi-directional communication for band 25. The band is then split wherein Tx port of the transmission port 1004 transmits communications towards the antenna from the wireless communication device, and the Rx port of the transmission port 1004 receives communications from the antenna for the wireless communication device.

The path for band 41 requires a 1.5 pF capacitor 1018 followed by a 3.3 nH inductor 1020 connected to an enable/disable switch 1010 followed by a 4.7 pF capacitor 1022 followed by a filter 1024 configured for bi-directional communication for band 41. The filter is connected to a Tx/Rx port 1006, wherein transmissions are transmitted and received.

Figure 11:
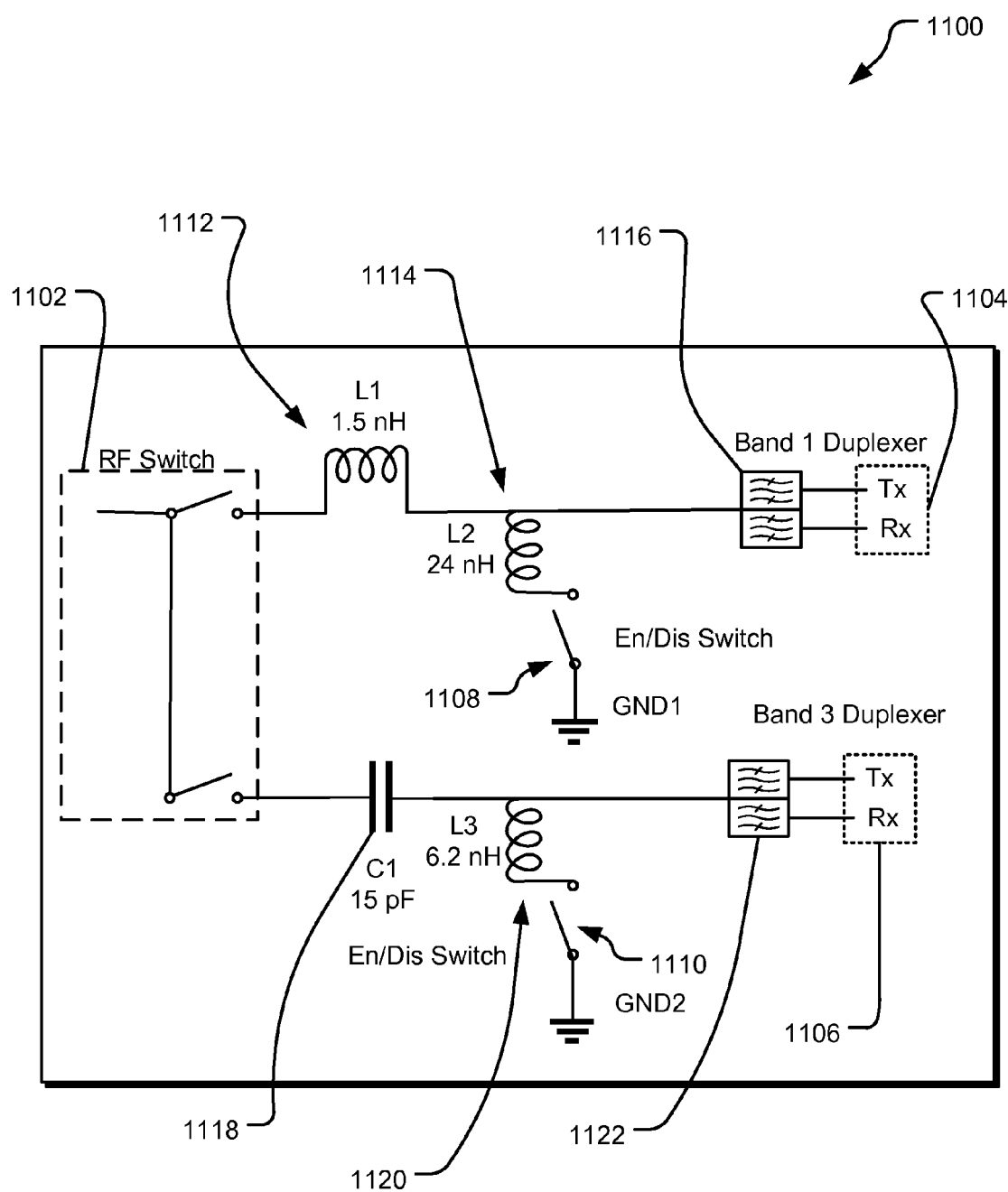
FIG. 11 illustrates another example schematic of a switch bank to port assembly for a particular sub-band pair.

FIG. 11 illustrates another example schematic of a switch bank to port assembly 1100 for a particular sub-band pair. The schematic illustrates the elements required from a switch 1102 of a RF switch bank (not shown) to a pair of transmission ports 1104 and 1106 to the communication channels of the wireless communication device for a sub-band 1 and sub-band 3 impedance matching circuit. The schematic illustrates that a signal path for band 1 requires a 1.5 nH inductor 1112 followed by a 24 nH inductor 1114 connected to enable/disable switch 1108 followed by duplexer 1116 configured for bi-directional communication for band 1. The band is then split wherein Tx port of the transmission port 1104 transmits communications towards the antenna from the wireless communication device, and the Rx port of the transmission port 1104 receives communications from the antenna for the wireless communication device.

The path for band 3 requires a 15 pF capacitor 1118 followed by a 6.2 nH inductor 1120 connected to an enable disable switch 1110 followed by a duplexer 1122 configured for bi-directional communication for band 3. The band is then split wherein the Tx port of the transmission port 1106 transmits communications towards the antenna from the wireless communications device, and the Rx port of the transmission port 1106 receives communications from the antenna for the wireless communication device.

Figure 12:
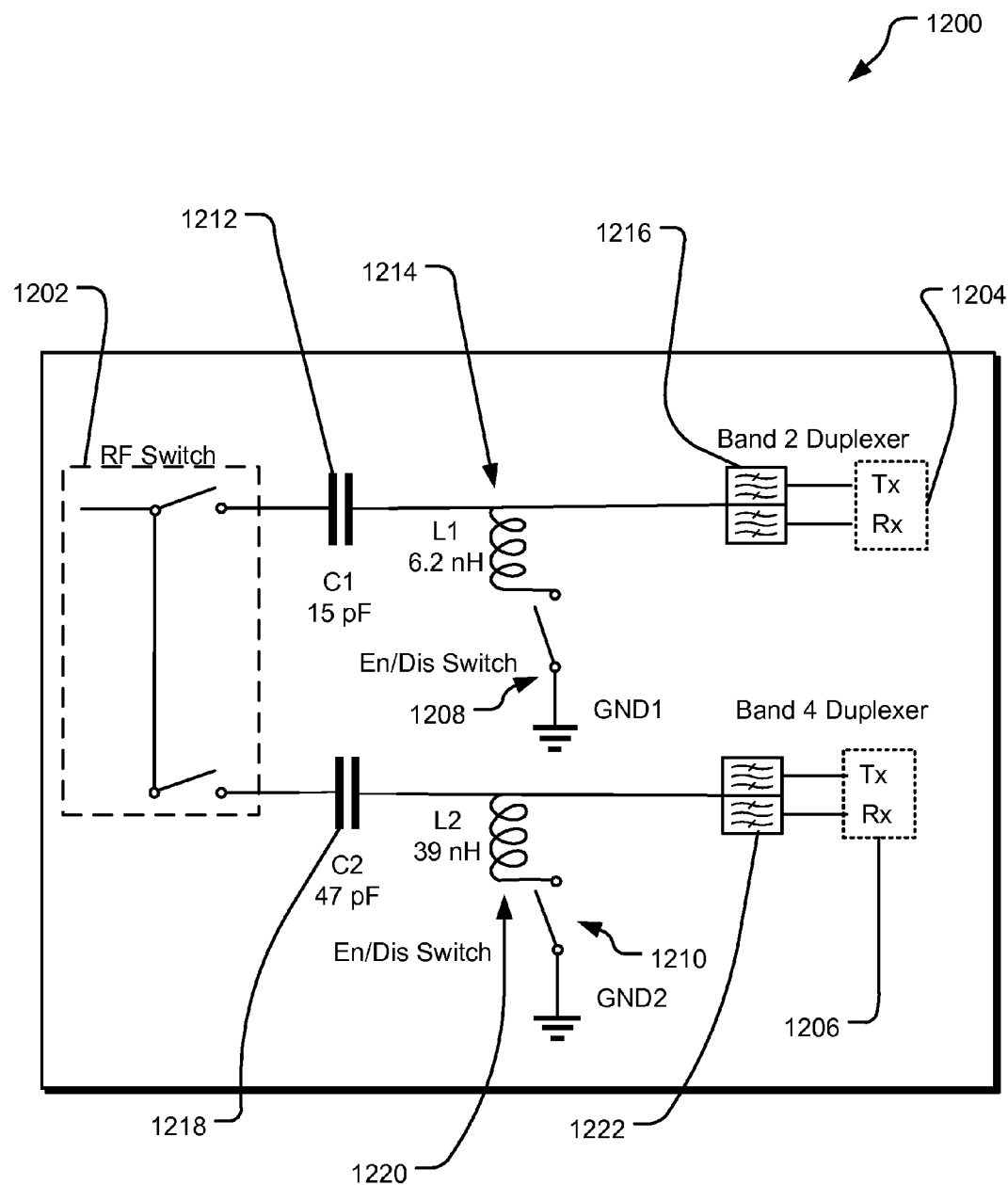
FIG. 12 illustrates another example schematic of a switch bank to port assembly for a particular sub-band pair.

FIG. 12 illustrates another example schematic of a switch bank to port assembly 1200 for a particular sub-band pair. The schematic illustrates the elements required from a switch 1202 of a RF switch bank (not shown) a pair of transmission ports 1204 and 1206 to the communication channels of the wireless communication device for a sub-band 2 and sub-band 4 impedance matching circuit. The schematic illustrates that a signal path for band 2 requires a 15 pF capacitor 1212 followed by an 6.2 nH inductor 1214 connected to an enable disable switch 1208 followed by a duplexer 1216 configured for bi-directional communication for band 2. The band is then split wherein Tx port of the transmission port 1204 transmits communications towards the antenna from the wireless communication device, and the Rx port of the transmission port 1204 receives communications from the antenna for the wireless communication device.

The path for band 4 requires a 47 pF capacitor 1218 followed by a 39 nH inductor 1220 connected to an enable/disable switch 1210 followed by a duplexer 1222 configured for bi-directional communication for band 4. The band is then split wherein the Tx port of the transmission port 1206 transmits communications towards the antenna from the wireless communications device, and the Rx port of the transmission port 1206 receives communications from the antenna for the wireless communication device.

The wireless communication device may include a variety of tangible computer-readable storage media and intangible computer-readable communication signals. Tangible computer-readable storage can be embodied by any available media that can be accessed by the wireless communication device and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by the wireless communication device. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example system for selectively connecting antenna signals of a wireless communication device includes switch bank circuitry configured to selectively communicate the antenna signals between at least one antenna port and at least one communication port. The antenna signals are allocated to one or more frequency bands, the one or more frequency bands being divided into one or more frequency sub-bands. A frequency matched port assembly for each frequency sub-band communicatively is connected to the switch bank circuitry and the communication port of the wireless communication device. The frequency matched port assembly includes impedance matching circuitry.

Another example system of any preceding system includes the frequency matched port assembly that further includes a duplexer configured to allow bi-directional communication over a single path.

Another example system of any preceding system includes an enable/disable switch communicatively connected to each matching circuit. The enable/disable switch is configured to enable the matching circuit or disable the matching circuit based on an instruction received from a processor.

Another example system of any preceding system includes the matching circuit as configured according to a frequency of a first sub-band and a frequency of a second sub-band.

Another example system of any preceding system supports a first sub-band and a second sub-band are selected from the group consisting of sub-bands 2 and sub-band 30, sub-band 3 and sub-band 7, sub-band 4 and sub-band 30, sub-band 25 and sub-band 41, sub-band 1 and sub-band 3, and sub-band 2 and sub-band 4.

Another example system of any preceding system manages the one or more frequency bands being at least one of high and middle bands and a first sub-band and a second sub-band corresponding sub-band pairs selected from the at least one high and middle bands.

Another example system of any preceding system includes a high/middle band antenna communicatively connected to the switch bank circuitry.

Another example system of any preceding system includes the switch bank circuitry, which is further configured to selectively communicate a first sub-band and a second-sub band of the one or more frequency sub-bands. The first sub-band and the second-sub band are corresponding based on carrier aggregation. The first sub-band having a frequency match port assembly. The second sub-band has a second frequency match port assembly.

An example method of communicating signals of a wireless communication device includes receiving a request to wirelessly communicate via one or more frequency sub-bands of antenna signals and selectively communicating via the one or more frequency sub-bands. A switch bank circuitry selectively communicates the one or more frequency sub-bands between at least one antenna port and at least one designated communication port of the wireless communication device. Each of the one or more frequency sub-bands is allocated to a designated matching circuit.

Another example method of any preceding method claim further includes receiving a request to wirelessly communicate via two or more frequency sub-bands of antenna signals for carrier aggregation and selectively matching an impedance of a first sub-band of the two or more corresponding frequency sub-bands with an impedance of a corresponding second sub-band of the two or more corresponding frequency sub-bands. The first sub-band is allocated to a first matching circuit and the second sub-band is allocated to a second matching circuit. The example method further includes selectively communicating the first sub-band and second sub-band between the at least one antenna port and the at least one designated communication port using the switch bank circuitry.

Another example method of any preceding method claim includes a selective matching operation in which selectively matching the impedance of the first sub-band with the impedance of the second sub-band is executed exclusively when the request includes a request to use the first sub-band and the second sub-band simultaneously.

Another example method of any preceding method claim includes a selective matching operation in which the selectively matching operation further includes selectively enabling the first matching circuit via a first enable/disable switch and selectively enabling the second matching circuit via a first enable/disable switch.

Another example method of any preceding method claim further includes receiving an instruction to wirelessly communicate via a single sub-band of the one or more frequency bands, selectively disabling the first matching circuit via the first enable/disable switch, and selectively communicating the single-sub band between the at least one antenna port and the at least one designated communication port using the switch bank circuitry.

Another example method of any preceding method supports a first sub-band and a second sub-band are selected from the group consisting of sub-bands 2 and sub-band 30, sub-band 3 and sub-band 7, sub-band 4 and sub-band 30, sub-band 25 and sub-band 41, sub-band 1 and sub-band 3, and sub-band 2 and sub-band 4.

One or more tangible processor-readable storage media embodied with instructions for executing on one or more processors and circuits of a device an example process to communicate antenna signals of a wireless communications device, the example process includes receiving a request to wirelessly communicate via one or more frequency sub-bands of antenna signals and selectively communicating via the one or more frequency sub-bands. A switch bank circuitry selectively communicates the one or more frequency sub-bands between at least one antenna port and at least one designated communication port of the wireless communication device. Each of the one or more frequency sub-bands is allocated to a designated matching circuit.

Another one or more tangible processor-readable storage media of any preceding method claim wherein the example process further includes receiving a request to wirelessly communicate via two or more frequency sub-bands of antenna signals for carrier aggregation and selectively matching an impedance of a first sub-band of the two or more corresponding frequency sub-bands with an impedance of a corresponding second sub-band of the two or more corresponding frequency sub-bands. The first sub-band is allocated to a first matching circuit and the second sub-band is allocated to a second matching circuit. The example process also includes selectively communicating the first sub-band and second sub-band between the at least one antenna port and the at least one designated communication port using the switch bank circuitry.

Another one or more tangible processor-readable storage media of any preceding method claim wherein the example process further includes selectively enabling the first matching circuit via a first enable/disable switch and selectively enabling the second matching circuit via a first enable/disable switch.

Another one or more tangible processor-readable storage media of any preceding method claim wherein the example process further includes receiving an instruction to wirelessly communicate via a single sub-band of the one or more frequency bands, selectively disabling the first matching circuit via the first enable/disable switch, selectively disabling the second matching circuit via the second enable/disable switch, and selectively communicating the single-sub band between the at least one antenna port and the at least one designated communication port using the switch bank circuitry.

Another one or more tangible processor-readable storage media of any preceding method claim includes a selectively matching operation includes selectively matching the impedance of the first sub-band with the impedance of the second sub-band is executed exclusively when the request includes a request to use the first sub-band and the second sub-band simultaneously.

Another one or more tangible processor-readable storage media of any preceding method claim supports a first sub-band and a second sub-band are selected from the group consisting of sub-bands 2 and sub-band 30, sub-band 3 and sub-band 7, sub-band 4 and sub-band 30, sub-band 25 and sub-band 41, sub-band 1 and sub-band 3, and sub-band 2 and sub-band 4.

An example system of communicating signals of a wireless communication device includes means for receiving a request to wirelessly communicate via one or more frequency sub-bands of antenna signals and selectively communicating via the one or more frequency sub-bands. A switch bank circuitry selectively communicates the one or more frequency sub-bands between at least one antenna port and at least one designated communication port of the wireless communication device. Each of the one or more frequency sub-bands is allocated to a designated matching circuit.

Another example system of any preceding system claim further includes means for receiving a request to wirelessly communicate via two or more frequency sub-bands of antenna signals for carrier aggregation and means for selectively matching an impedance of a first sub-band of the two or more corresponding frequency sub-bands with an impedance of a corresponding second sub-band of the two or more corresponding frequency sub-bands. The first sub-band is allocated to a first matching circuit and the second sub-band is allocated to a second matching circuit. The example system further includes means for selectively communicating the first sub-band and second sub-band between the at least one antenna port and the at least one designated communication port using the switch bank circuitry.

Another example system of any preceding system claim includes a means for selectively matching the impedance of the first sub-band with the impedance of the second sub-band is executed exclusively when the request includes a request to use the first sub-band and the second sub-band simultaneously.

Another example system of any preceding system claim includes means for selectively enabling the first matching circuit via a first enable/disable switch and means for selectively enabling the second matching circuit via a first enable/disable switch.

Another example system of any preceding system claim further includes means for receiving an instruction to wirelessly communicate via a single sub-band of the one or more frequency bands, means for selectively disabling the first matching circuit via the first enable/disable switch, and means for selectively communicating the single-sub band between the at least one antenna port and the at least one designated communication port using the switch bank circuitry.

Another example system of any preceding system supports a first sub-band and a second sub-band are selected from the group consisting of sub-bands 2 and sub-band 30, sub-band 3 and sub-band 7, sub-band 4 and sub-band 30, sub-band 25 and sub-band 41, sub-band 1 and sub-band 3, and sub-band 2 and sub-band 4.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A system for selectively connecting antenna signals of a wireless communication device, the system comprising:
   switch bank circuitry configured to selectively communicate the antenna signals between at least one antenna port and at least one communication port, the antenna signals being allocated to one or more frequency bands, the one or more frequency bands being divided into two or more frequency sub-bands, the switch bank circuitry being further configured to communicate a first frequency sub-band and a second frequency sub-band of the two or more frequency sub-bands responsive to a request from a processor for carrier aggregation; and
   a frequency matched port assembly for each frequency sub-band communicatively connected to the switch bank circuitry and the communication port of the wireless communication device, the frequency matched port assembly including an enable/disable switch and an associated matching circuitry, the enable/disable switch being communicatively coupled to the associated matching circuitry, each enable/disable switch being configured to enable the associated matching circuitry or disable the associated matching circuitry, the first frequency sub-band allocated to a first matching circuitry and the second frequency sub-band being allocated to a second matching circuitry, an enable/disable switch associated with the first matching circuitry and an enable/disable switch associated with the second matching circuitry enabling the associated matching circuitries to selectively match an impedance of the first frequency sub-band with an impedance of the second frequency sub-band responsive to the request from the processor.

2. The system of claim 1, the frequency matched port assembly further comprising a duplexer, the duplexer configured to allow bi-directional communication over a single path.

3. The system of claim 1, wherein the first matching circuitry is configured according to a frequency of the first frequency sub-band and the second matching circuitry is configured according to a frequency of the second frequency sub-band.

4. The system of claim 1, wherein the first frequency sub-band and the second frequency sub-band are selected from the group consisting of sub-bands 2 and sub-band 30, sub-band 3 and sub-band 7, sub-band 4 and sub-band 30, sub-band 25 and sub-band 41, sub-band 1 and sub-band 3, and sub-band 2 and sub-band 4.

5. The system of claim 1, wherein the one or more frequency bands are at least one of high and middle bands and the first frequency sub-band and the second frequency sub-band are corresponding sub-band pairs selected from the at least one high and middle bands.

6. The system of claim 1, further comprising a high/middle band antenna communicatively connected to the switch bank circuitry.

7. A method of communicating antenna signals of a wireless communication device, the method comprising:
   receiving a request to wirelessly communicate via a first frequency sub-band and a second frequency sub-band of the antenna signals, the first frequency sub-band and the second frequency sub-band being corresponding frequency sub-bands for carrier aggregation;
   selectively communicating the first frequency sub-band and the second frequency sub-band between at least one antenna port and at least one designated communication port using a switch bank circuitry the switch bank circuitry configured to selectively communicate two or more frequency sub-bands between the at least one antenna port and the at least one designated communication port of the wireless communication device, each of the one or more frequency sub-bands being allocated to a designated matching circuit and a designated enable/disable switch communicatively connected to the designated matching circuit, the designated enable/disable switch being configured to enable the designated matching circuit or disable the designated matching circuit based on an instruction received from a processor; and
   selectively matching an impedance of the first frequency sub-band with an impedance of the second frequency sub-band, the first frequency sub-band being allocated to a first matching circuit and the second frequency sub-band being allocated to a second matching circuit.

8. The method of claim 7 wherein selectively matching the impedance of the first frequency sub-band with the impedance of the second frequency sub-band is executed exclusively when the request includes a request to use the first frequency sub-band and the second frequency sub-band simultaneously.

9. The method of claim 7 wherein the selectively matching operation further comprises:
   selectively enabling the first matching circuit via a first enable/disable switch allocated to the first frequency sub-band; and
   selectively enabling the second matching circuit via a second enable/disable switch allocated to the second frequency sub-band.

10. The method of claim 9, further comprising:
    receiving an instruction to wirelessly communicate via a single frequency sub-band of the one or more frequency bands;
    selectively disabling the first matching circuit via the first enable/disable switch; and selectively communicating the single frequency sub-band between the at least one antenna port and the at least one designated communication port using the switch bank circuitry.

11. The method of claim 7, wherein the first frequency sub-band and the second frequency sub-band are selected from the group consisting of sub-bands 2 and sub-band 30, sub-band 3 and sub-band 7, sub-band 4 and sub-band 30, sub-band 25 and sub-band 41, sub-band 1 and sub-band 3, and sub-band 2 and sub-band 4.

12. One or more tangible processor-readable storage media embodied with instructions for executing on one or more processors and circuits of a device a process to communicate antenna signals of a wireless communications device, the process comprising:
receiving a request to wirelessly communicate via a first frequency sub-band and a second frequency sub-band of the antenna signals, the first frequency sub-band and the second frequency sub-band being corresponding frequency sub-bands for carrier aggregation;
selectively communicating the first frequency sub-band and the second frequency sub-band between at least one antenna port and at least one designated communication port using a switch bank circuitry, the switch bank circuitry configured to selectively communicate two or more frequency sub-bands between the at least one antenna port and the at least one designated communication port of the wireless communication device each of the one or more frequency sub-bands being allocated to a designated matching circuit and a designated enable/disable switch communicatively connected to the designated matching circuit, the designated enable/disable switch being configured to enable the designated matching circuit or disable the designated matching circuit based on an instruction received from a processor; and
selectively matching an impedance of the first frequency sub-band with an impedance of the second frequency sub-band, the first frequency sub-band being allocated to a first matching circuit and the second frequency sub-band being allocated to a second matching circuit.

13. The one or more tangible processor-readable storage media of claim 12, the process further comprising:
selectively enabling the first matching circuit via a first enable/disable switch, allocated to the first frequency sub-band; and
selectively enabling the second matching circuit via a second enable/disable switch, allocated to the second frequency sub-band.

14. The one or more tangible processor-readable storage media of claim 13, the process further comprising:
receiving an instruction to wirelessly communicate via a single frequency sub-band of the one or more frequency bands;
selectively disabling the first matching circuit via the first enable/disable switch;
selectively disabling the second matching circuit via the second enable/disable switch; and
selectively communicating the single frequency sub-band between the at least one antenna port and the at least one designated communication port using the switch bank circuitry.

15. The one or more tangible processor-readable storage media of claim 12, wherein selectively matching the impedance of the first frequency sub-band with the impedance of the second frequency sub-band is executed exclusively when the request includes a request to use the first frequency sub-band and the second frequency sub-band simultaneously.

16. The one or more tangible processor-readable storage media of claim 12, wherein the first frequency sub-band and the second frequency sub-band are selected from the group consisting of sub-bands 2 and sub-band 30, sub-band 3 and sub-band 7, sub-band 4 and sub-band 30, sub-band 25 and sub-band 41, sub-band 1 and sub-band 3, and sub-band 2 and sub-band 4.

* * * * *